United States Patent
Huang et al.

(10) Patent No.: US 10,374,536 B2
(45) Date of Patent: Aug. 6, 2019

(54) CEILING FAN, METHOD FOR CONTROLLING CEILING FAN MOTOR AND CONTROL DEVICE FOR CEILING FAN MOTOR

(71) Applicant: INDUSTRIAL TECHNOLOGY RESEARCH INSTITUTE, Hsinchu (TW)

(72) Inventors: Liang-Qiao Huang, Changhua County (TW); Yu-Choung Chang, Hsinchu County (TW); Yang-Guang Liu, Hsinchu County (TW); Zhi-Jia Liang, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/019,343

(22) Filed: Jun. 26, 2018

(65) Prior Publication Data

US 2019/0199254 A1 Jun. 27, 2019

(30) Foreign Application Priority Data

Dec. 26, 2017 (TW) .............................. 106145795 A

(51) Int. Cl.
*H02P 6/182* (2016.01)
*H02P 6/08* (2016.01)
(Continued)

(52) U.S. Cl.
CPC ................ *H02P 6/182* (2013.01); *H02P 6/08* (2013.01); *F04D 25/088* (2013.01); *H02P 6/06* (2013.01)

(58) Field of Classification Search
CPC ...... H02P 1/00; H02P 1/04; H02P 1/24; H02P 1/46; H02P 6/00; H02P 6/04; H02P 6/06;
(Continued)

(56) References Cited

U.S. PATENT DOCUMENTS 7,196,485 B1 3/2007 Lee et al.
7,805,063 B2 9/2010 Peng et al.
(Continued)

FOREIGN PATENT DOCUMENTS

CN 201004614 Y 1/2008
CN 104159798 A 11/2014
(Continued)

OTHER PUBLICATIONS

TW Office Action dated Aug. 1, 2018 as received in Application No. 106145795.

*Primary Examiner* — Antony M Paul
(74) *Attorney, Agent, or Firm* — Maschoff Brennan

(57) ABSTRACT

A method for controlling a ceiling fan motor includes: setting a target value of rotational speed and a limited value of rotational torque; controlling the ceiling fan motor to operate; obtaining operation information of the ceiling fan motor; calculating a current rotational speed and a current rotational torque according to the operation information; determining whether the current rotational torque is greater than or equal to the limited value of rotational torque; performing a constant rotational torque operation when the current rotational torque is greater than or equal to the limited value of rotational torque; determining whether the current rotational speed reaches the target value of rotational speed when the current rotational torque is less than the limited value of rotational torque; performing a constant rotational speed operation when the current rotational speed
(Continued)

reaches the target value of rotational speed; and increasing torque current of the ceiling fan motor.

11 Claims, 9 Drawing Sheets

(51) Int. Cl.
*F04D 25/08* (2006.01)
*H02P 6/06* (2006.01)

(58) Field of Classification Search
CPC .... H02P 6/08; H02P 6/008; H02P 8/14; H02P 21/00; H02P 21/0021; H02P 21/0035; H02P 23/00; H02P 23/0027; H02P 23/0036; H02P 27/00; H02P 27/04; H02P 27/06; H04Q 9/00
USPC .............. 318/400.01, 400.02, 700, 701, 727, 318/400.03, 400.07, 400.14, 400.15, 721, 318/779, 799, 800, 801, 430, 432; 388/800, 821, 823
See application file for complete search history.

(56) References Cited

U.S. PATENT DOCUMENTS

| | | | |
|---|---|---|---|
| 7,960,931 B2 * | 6/2011 | Rodriguez | H02P 6/085 318/432 |
| 9,573,575 B2 | 2/2017 | Gerdes et al. | |
| 2010/0109578 A1 | 5/2010 | Tsai et al. | |
| 2016/0347407 A1 | 12/2016 | Tsuchizawa et al. | |

FOREIGN PATENT DOCUMENTS

| | | |
|---|---|---|
| TW | 114633 B | 6/1989 |
| TW | M290932 U | 5/2006 |
| TW | I276299 B | 3/2007 |
| TW | M354950 U | 4/2009 |
| TW | I358192 B | 2/2012 |
| TW | M485964 U | 9/2014 |
| TW | M501050 U | 5/2015 |
| TW | I501541 B | 9/2015 |

* cited by examiner

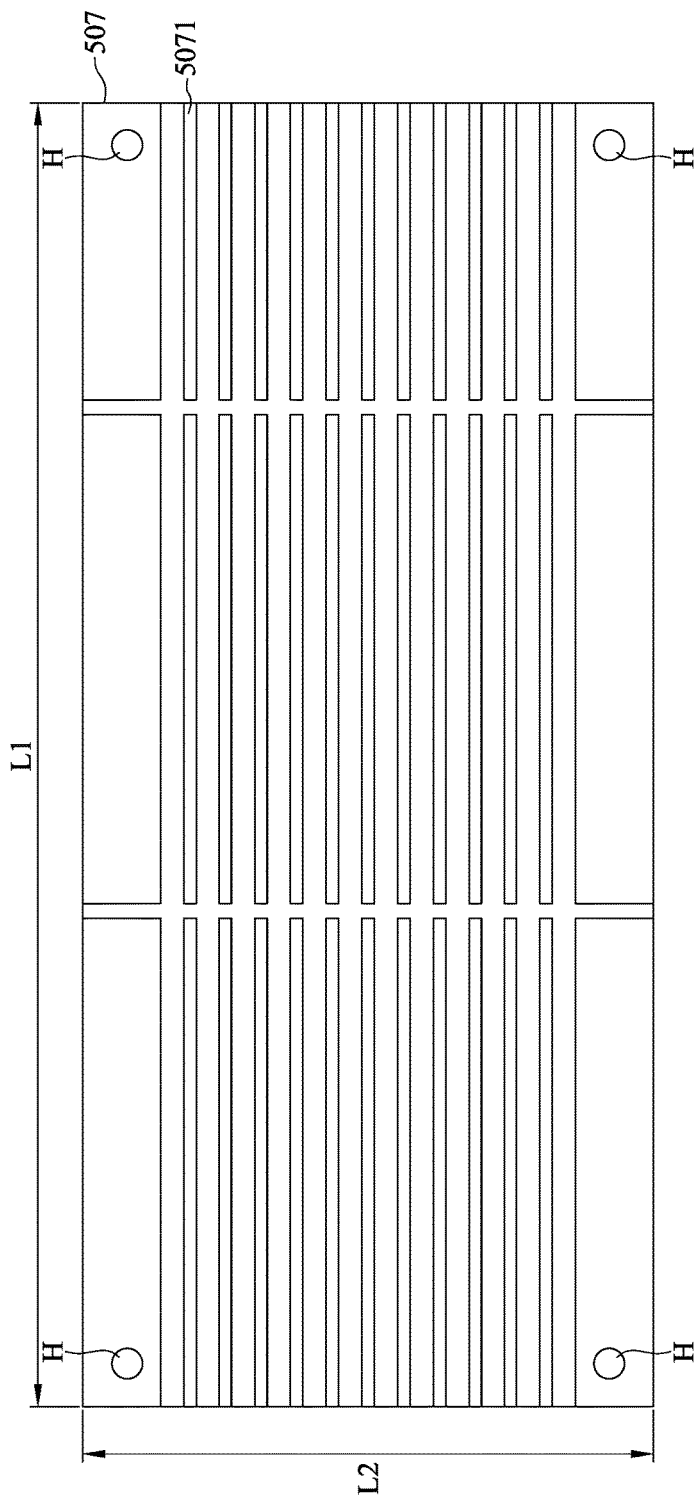
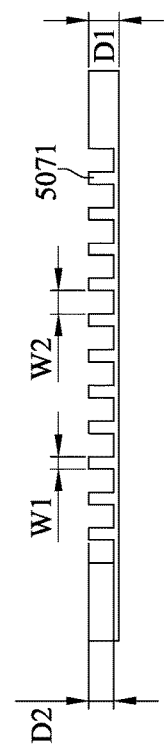
FIG. 8
FIG. 9

CEILING FAN, METHOD FOR CONTROLLING CEILING FAN MOTOR AND CONTROL DEVICE FOR CEILING FAN MOTOR

CROSS-REFERENCE TO RELATED APPLICATIONS

This non-provisional application claims priority under 35 U.S.C. § 119(a) on Patent Application No(s). 106145795 filed in Taiwan, R.O.C. on Dec. 26, 2017, the entire contents of which are hereby incorporated by reference.

TECHNICAL FIELD

The disclosure relates to a ceiling fan, a method for controlling a ceiling fan and a control device for a ceiling fan.

BACKGROUND

Currently, conventional ceiling fan rotation control methods are performed based on speed of the blades as main control parameters so as to control rotation of the blades using a constant-speed control system. The control methods include setting several target speeds corresponding to a respective one of several segments by manufacturers according to size, shape and materials of the fan blades. However, this kind of control methods would result in a condition in which the control program needs to set different speeds depending on selections of the blades of the ceiling fan. As a result, the significant problems of technical service and commodity stocks are raised.

Furthermore, the target rotation speed is fixed while the ceiling fan motor and the driver vary depending on the combination of the blades in consideration of factors of size, shape, material of blades, etc. Therefore, when a user replaces the blades with other blades having different materials and size, the ceiling fan fails to operate based on its original settings. The loading applied onto the ceiling fan motor may be even heavier after replacing the blades with the other blades. Accordingly, the ceiling fan motor constantly increases the output power in order to perform the target speed control. Eventually, the over loading of the output power overheats the ceiling fan motor.

SUMMARY

A method for controlling a ceiling fan motor is disclosed according to one embodiment of the present disclosure. The method includes the following steps: setting a target value of rotational speed and a limited value of rotational torque related to the ceiling fan motor; controlling the ceiling fan motor to operate by a processor; obtaining operation information of the ceiling fan motor by a motor-current sampling circuit; calculating a current rotational speed and a current rotational torque by the processor according to the operation information; determining whether the current rotational torque is greater than or equal to the limited value of rotational torque; performing a constant rotational torque operation by the processor when the current rotational torque is greater than or equal to the limited value of rotational torque; determining whether the current rotational speed reaches the target value of rotational speed by the processor when the current rotational torque is less than the limited value of rotational torque; performing a constant rotational speed operation by the processor when the processor determines that the current rotational speed reaches the target value of rotational speed; and increasing torque current of the ceiling fan motor by the processor and returning to step of obtaining the operation information of the ceiling fan motor by the motor-current sampling circuit when the processor determines that the current rotational speed does not reach the target value of rotational speed.

A control device for a ceiling fan motor is disclosed according to one embodiment of the present disclosure. The control system includes a power supplying circuit, a processor, a motor driving circuit and a motor-current sampling circuit. The power supplying circuit is configured to acquire an external power so as to output a working voltage. The processor is electrically connected to the power supplying circuit. The processor operates based on the working voltage. The processor is configured to obtain a target value of rotational speed and a limited value of rotational torque related to the ceiling fan motor and the processor is configured to generate a control command. The motor driving circuit is electrically connected to the power supplying circuit and the processor. The motor driving circuit operates based on the working voltage, and the motor driving circuit is configured to drive the ceiling fan motor according to the control command. The motor-current sampling circuit is electrically connected to the processor and operates based on the working voltage. The motor-current sampling circuit is configured to obtain operation information related to the ceiling fan motor. The operation information is adapted for the processor to obtain a current rotational speed and a current rotational torque. The processor determines whether to perform a constant rotational torque operation according to the current rotational torque and the limited value of rotational torque, and the processor selectively determines whether to increase torque current of the ceiling fan motor according to the current rotational speed and the target value of rotational speed.

A ceiling fan is disclosed according to one embodiment of the present disclosure. The ceiling fan includes a ceiling fan motor, a driver and a set of fan blades. The driver includes a first cover, a second cover, a circuit board and a cooling board. The second cover is combined with the first cover to form an accommodating space. The circuit board is disposed in the accommodating space. The circuit board includes a control device identical to the aforementioned control device. The control device controls the ceiling fan motor according to the control command of the motor driving circuit. The cooling board is disposed in the accommodating space and combined with the circuit board. The cooling board has a plurality of fins spaced in a distance from one another. The set of fan blades is detachably combined with the ceiling fan motor and driven by the ceiling fan motor to rotate.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 8 is a top view of the cooling board according to one embodiment of the present disclosure;

FIG. 9 is a side view of the cooling board according to one embodiment of the present disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
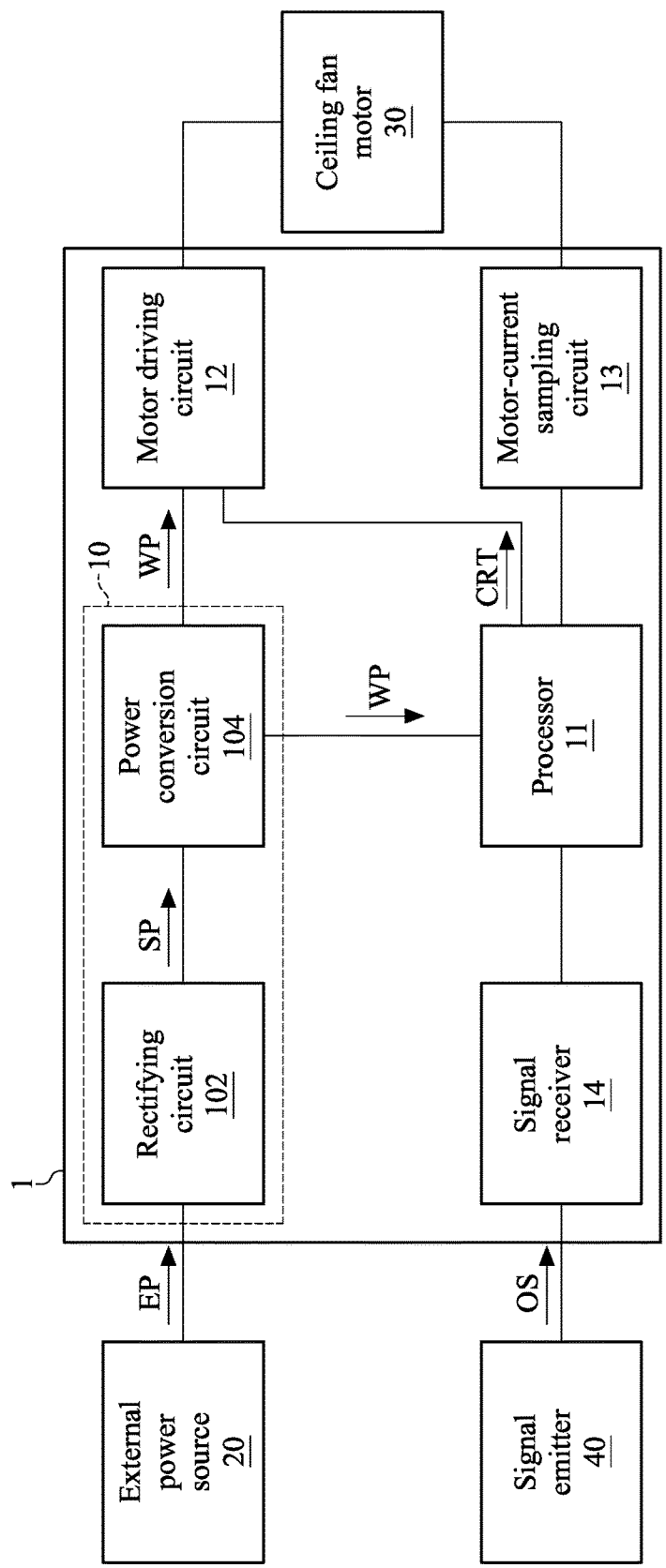
FIG. 1 is a block diagram of a control device for controlling a ceiling fan motor according to one embodiment of the present disclosure.

Please refer to FIG. 1, which is a block diagram of a control device for controlling a ceiling fan motor according to one embodiment of the present disclosure. As shown in FIG. 1, the control device 1 includes a power supplying circuit 10, processor 11, the motor driving circuit 12 and the motor-current sampling circuit 13. The power supplying circuit 10 is electrically connected to the external power source 20 to acquire external power EP from the external power source 20, so that the power supplying circuit 10 outputs working voltage. In this embodiment, the power supplying circuit 10 is adapted to provide a working voltage WP to the processor 11, the motor driving circuit 12 and the motor-current sampling circuit 13 respectively, so that the processor 11, the motor driving circuit 12 and the motor-current sampling circuit 13 operate based on the working voltage WP.

In one embodiment, as shown in FIG. 1, the power supplying circuit 10 includes a rectifying circuit 102 and a power conversion circuit 104. The rectifying circuit 102 is electrically connected to the external power source 20 and configured to convert the external power EP in AC mode into a supplying power SP in DC mode by rectifying. The power conversion circuit 104 is electrically connected to the rectifying circuit 102, the processor 11 and the motor driving circuit 12. The power conversion circuit 104 is configured to regulate a voltage of the supplying power SP so as to output the working voltage WP. In practice, the working voltage WP outputted to the processor 11, the working voltage WP outputted to the motor driving circuit 12 and the working voltage WP outputted to motor-current sampling circuit 13 are not necessarily consistent. As described above, the rectifying circuit 102 is used for rectifying/filtering the power, and the power conversion circuit 104 is used for regulating the voltage of the power. Persons having ordinary skills in the art are able to design the circuit structures of the rectifying circuit 102 and the power conversion circuit 104, so not repeated herein.

The processor 11 is electrically connected to the power supplying circuit 10 and the processor 11 is configured to obtain a target value of rotational speed as well as a limited value of rotational torque related to the ceiling fan motor 30 and to generate a control command CRT. In practice, as shown in FIG. 1, the control device 1 is equipped with a signal receiver 14. A user is allowed to control a signal emitter 40 to send an operation signal OS to the signal receiver 14 within the control device 1. The operation signal OS includes the target value of rotational speed and the limited value of rotational torque to be set. The signal receiver 14 further sends the operation signal OS to the processor 11, so that the processor 11 sets the target value of rotational speed and the limited value of rotational torque in the control device 1 based on the operation signal OS. The way that the processor 11 obtains the target value of rotational speed and the limited value of rotational torque is not limited to the way of using the operation signal OS. In another embodiment, the operation signal OS includes the target value of rotational speed only while the limited value of rotational torque is outputted/stored into the processor 11 in advanced.

The motor driving circuit 12 is electrically connected to the power supplying circuit 10 and the processor 11. The motor driving circuit 12 is configured to drive the ceiling fan motor 30 according to a control command CRT generated by the processor 11. The motor-current sampling circuit 13 is electrically connected to the processor 11. The motor-current sampling circuit 13 is configured to obtain operation information of the ceiling fan motor 30. The operation information is adapted for the processor 11 to obtain the current rotational speed and the current rotational torque of the ceiling fan motor 30. Specifically, in one embodiment, the operation information includes current information of the ceiling fan motor 30, and the processor 11 calculates the current rotational torque according to the current information. In further, the processor 11 calculates the current rotational speed of the ceiling fan motor 30 according to the current rotational torque.

Figure 2:
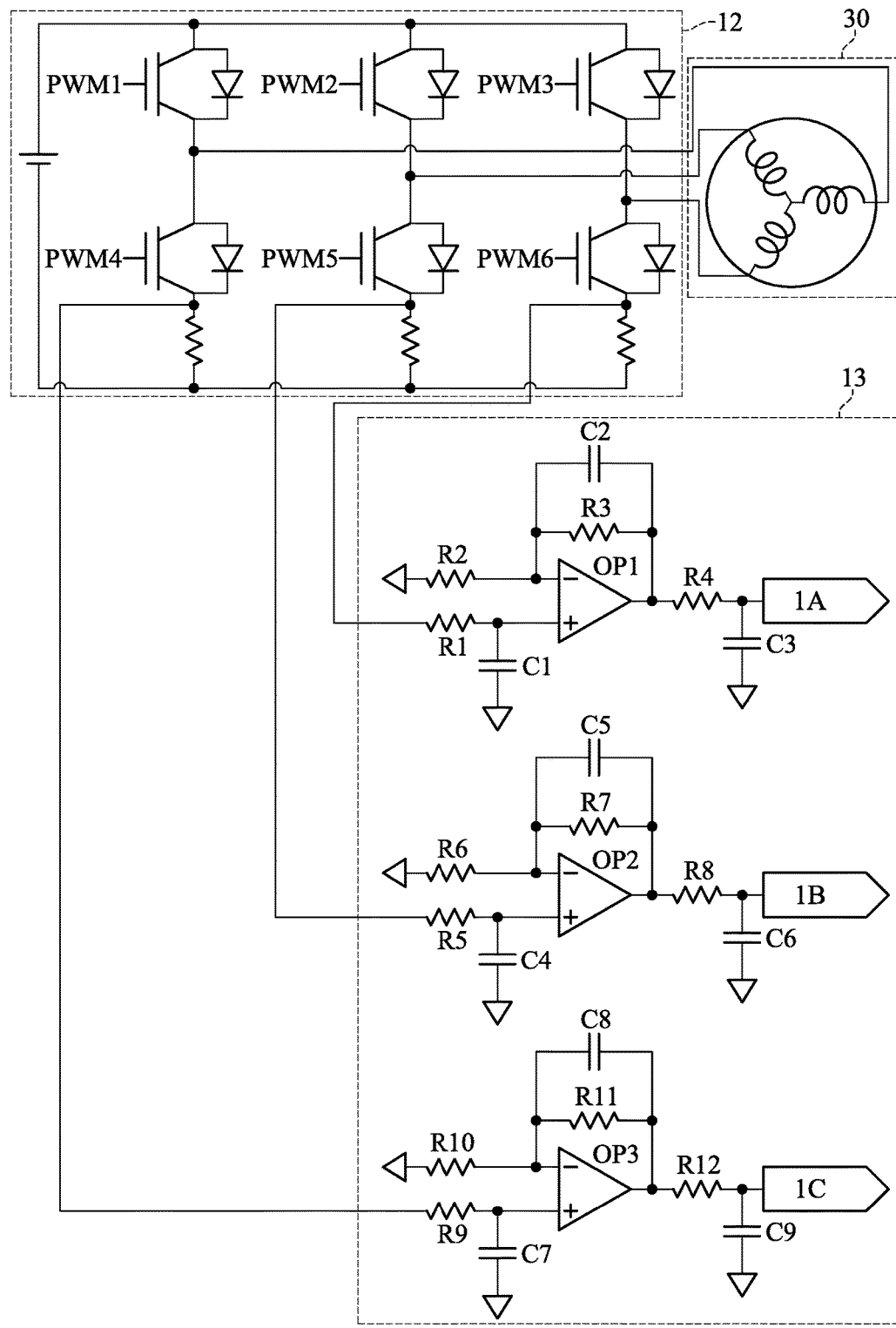
FIG. 2 is a circuit diagram of the motor-current sampling circuit 13 according to one embodiment of the present disclosure.

Please further refer to FIG. 2 for illustration about the process of obtaining the current information included in the operation information related to the ceiling fan motor 30 by the motor-current sampling circuit 13. FIG. 2 is a circuit diagram of the motor-current sampling circuit 13 according to one embodiment of the present disclosure. As shown in FIG. 2, the motor-current sampling circuit 13 includes amplifiers OP1-OP3, resistors R1-R12 and capacitors C1-C9. After controllers PWM1-PWM6 in the motor driving circuit 12 drive the ceiling fan motor 30 to operate, the motor-current sampling circuit 13 converts current signals of the ceiling fan motor 30 into voltage signals via resistors R13-R15, and further amplify/integrate the voltage signals via the amplifiers OP1-OP3, so as to output DC voltages. In further, the DC voltages are sent to the processor 11 and converted into digital signals, so that parameters of three-phase current IA-IC are obtained by the processor 11. In practice, the processor 11 transforms the three-phase current IA-IC into a two-phase quiescent coordinates current based on the Clarke transformation, and the two-phase quiescent coordinates current is further transformed into a two-phase dynamic coordinate current based on the Park transformation. Then, the processor 11 further calculates the information related to the ceiling fan motor 30, such as current rotational torque current, the magnetic field current as well as motor parameters according to the two-phase dynamic coordinate current. The processor 11 obtains the current rotational speed of the ceiling fan motor 30 by performing the calculation of back electromotive force (back EMF) according to the aforementioned information. The circuit diagram of the motor-current sampling circuit shown in FIG. 2 is for illustration only, and the present disclosure is not limited to the embodiment of FIG. 2.

After the processor 11 obtains the current rotational torque and the current rotational speed of the ceiling fan motor 30 by the aforementioned calculation, the processor 11 further determines whether to perform a constant rotational torque operation according to the current rotational torque and the limited value of rotational torque and selectively determines whether to increase torque current of the ceiling fan motor 30 according to the current rotational speed and the target value of rotational speed. Specifically, in one embodiment, the processor 11 is configured to determine whether the current rotational torque is greater than or equal to the limited value of rotational torque. When the processor 11 determines that the current rotational torque is greater than or equal to the limited value of rotational torque, the processor 11 performs the constant rotational torque operation based on the limited value of rotational torque. In one example, the constant rotational torque operation includes an operation that the processor 11 controls the ceiling fan motor 30 to operate based on the limited value of rotational torque. Contrarily, when the processor 11 determines that the current rotational torque is less than the limited value of rotational torque, the processor 11 determines whether to increase the torque current of the ceiling fan motor 30 according to the current rotational speed and the target value of rotational speed.

In one embodiment, when the current rotational speed reaches the target value of rotational speed, the processor 11 performs a constant rotational speed operation based on the target value of rotational speed. The constant rotational speed operation includes an operation that the processor 11 controls the ceiling fan motor 30 to operate based on the target value of rotational speed. Contrarily, when the current rotational speed does not reach the target value of rotational speed, the processor 11 continuously increases the torque current of the ceiling fan motor 30. In other words, in the control device for the ceiling fan motor of the present disclosure, the processor 11 determines whether the current rotational torque of the ceiling fan motor 30 reaches or goes beyond the limited value of rotational torque first. The processor 11 further determines whether the current rotational speed of the ceiling fan motor 30 reaches the target rotational speed only when the current rotational torque of the ceiling fan motor 30 does not reaches the limited value of rotational torque, so as to determine whether to increase the torque current of the ceiling fan motor 30. In practice, the limited value of rotational torque stands for the upper limit value of the rotational torque of the ceiling fan motor 30. If the rotational torque of the ceiling fan motor 30 during the operation goes beyond the upper limit value, it is possible that the ceiling fan motor 30 overheats due to the over loading. Accordingly, elements in the ceiling fan system would be broken or the safety issue is raised. By taking the advantages of the setting for the limited value of rotational torque in the present disclosure, it is ensured that the operation of the ceiling fan motor 30 remains stable without going beyond its acceptable loadings and raising the problems described above.

Figure 3:
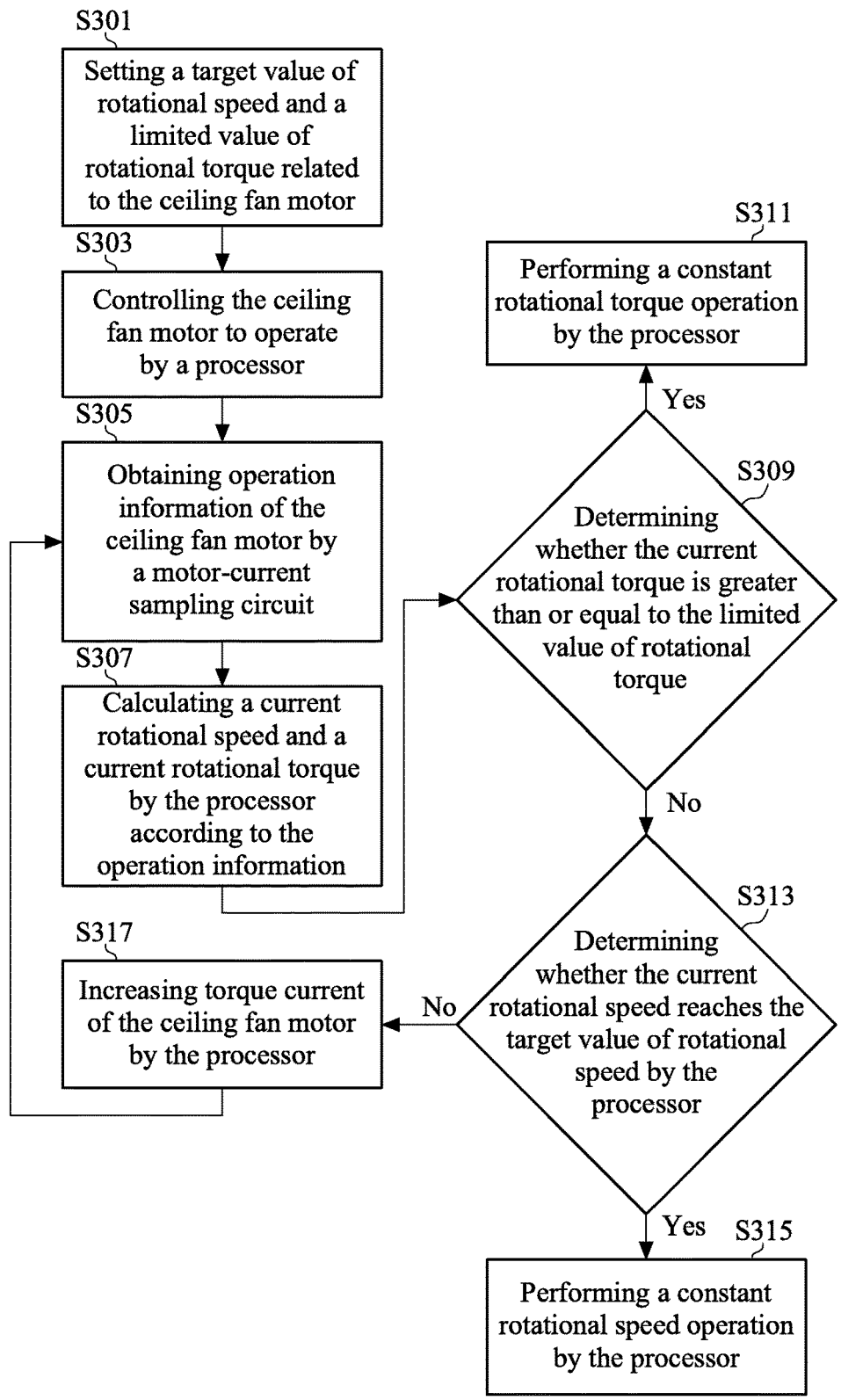
FIG. 3 is a flow chart of a method for controlling a ceiling fan motor according to one embodiment of the present disclosure.

Please refer to FIG. 1 and FIG. 3. FIG. 3 is a flow chart of a method for controlling a ceiling fan motor according to one embodiment of the present disclosure. The method is adapted to the control system as shown in FIG. 1. As shown in FIG. 3, in step S301, set a target value of rotational speed and a limited value of rotational torque related to the ceiling fan motor 30. In step S303, the processor 11 controls the ceiling fan motor 30 to operate. In other words, the processor 11 sends a control command to the motor driving circuit 12 so as to drive the ceiling fan motor 30 to operate. In step S305, the motor-current sampling circuit 13 obtains operation information of the ceiling fan motor 30. The operation information includes current information of the ceiling fan motor 30. In step S307, the processor 11 calculates the current rotational speed and the current rotational torque of the ceiling fan motor 30 according to the operation information. In practice, the processor 11 obtains the current rotational speed and the current rotational torque by calculation based on the Clarke transformation/Park transformation as well as the back EMF. The detailed descriptions about the calculations for the current rotational speed and the current rotational torque have been illustrated in the above paragraphs, so not repeated here.

In step S309, the processor 11 determines whether the current rotational torque is greater than or equal to the limited value of rotational torque. When the current rotational torque is greater than or equal to the limited value of rotational torque, the processor 11 performs a constant rotational torque operation in step S311. When the current rotational torque is less than the limited value of rotational torque, the processor 11 further determines whether the current rotational speed reaches the target value of rotational speed in step S313. When the processor 11 determines that the current rotational speed reaches the target value of rotational speed, the processor 11 performs a constant rotational speed operation according to the target value of rotational speed in step S315. When the processor 11 determines that the current rotational speed does not reach the target value of rotational speed, the processor 11 increases torque current of the ceiling fan motor 30 in step S317 and returning to step that the motor-current sampling circuit obtains the operation information. In this embodiment, the limited value of rotational torque stands for an upper limit of rotational torque of the ceiling fan motor 30. Based on the setting of the limited value of rotational torque in combination with the setting of the target value of rotational speed, the method for controlling the ceiling fan motor in the present disclosure, the method ensures that the operation of the ceiling fan motor 30 remains stable without going beyond its acceptable loadings and causing the problems of element damages or the safety issue.

Figure 4:
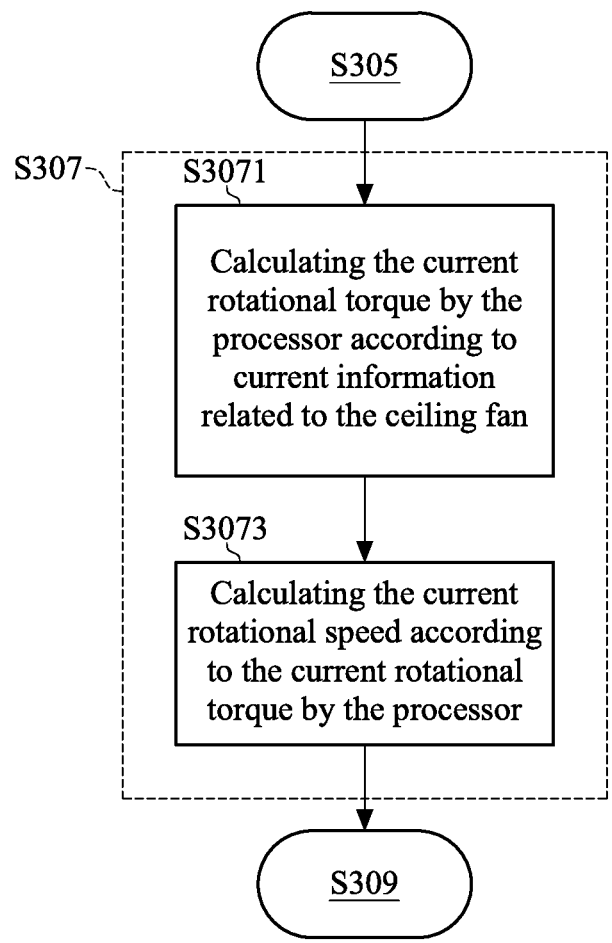
FIG. 4 is a flow chart of part of the method for controlling the ceiling fan motor according to one embodiment of the present disclosure.
Figure 5:
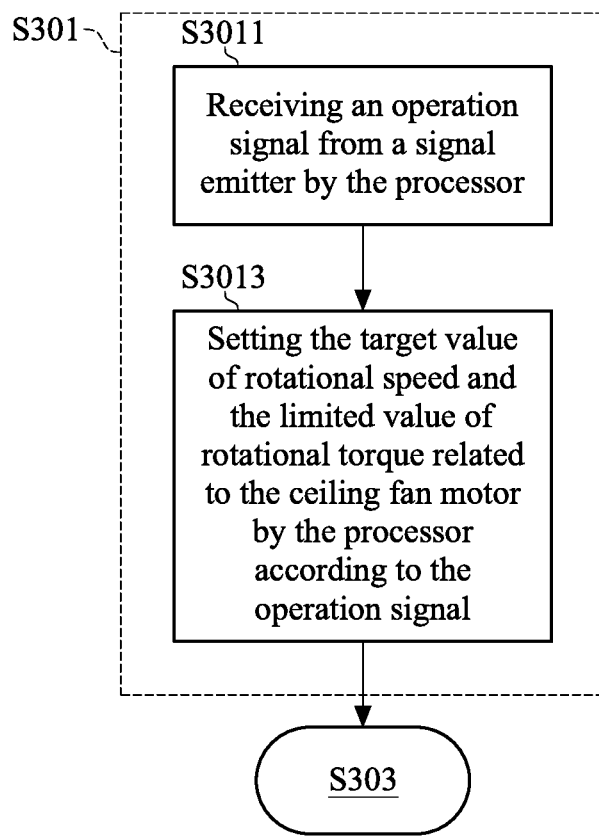
FIG. 5 is a flow chart of part of the method for controlling the ceiling fan motor according to another embodiment of the present disclosure.

Please refer to FIG. 4, which is a flow chart of part of the method for controlling the ceiling fan motor according to one embodiment of the present disclosure. Comparing to the embodiment of FIG. 3, step S307 shown in FIG. 4 further includes step S3071 and S3073. In step S3071, the processor 11 calculates the current rotational torque according to the current information of the ceiling fan motor 30, included in the operation information. In step S3073, the processor 11 further calculates the current rotational speed according to the current rotational torque. In practice, the processor 11 is a chip having function of computation to perform calculations of coordinate transformation (e.g. the Clarke transformation or the Park transformation) as well as the back EMF, so as to obtain the current rotational speed and the current rotational torque. Please further refer to FIG. 5, which is a flow chart of part of the method for controlling the ceiling fan motor according to another embodiment of the present disclosure. Comparing to the embodiment of FIG. 3, step S301 shown in FIG. 4 further includes step S3011 and S3013. In step S3011, the processor 11 receives the operation signal OS from the signal emitter 40. In step S3013, the processor 11 sets the target value of rotational speed and the limited value of rotational torque related to the ceiling fan motor 30 according to the operation signal OS. In practice, the signal emitter 40 is an external controller adapted for a user to control the external controller to emit the operation signal OS to the processor 11. The operation signal OS includes the target value of rotational speed and the limited value of rotational torque to be set, so the settings of the rotational speed/the rotational torque related to the ceiling fan motor 30 are achieved.

Figure 6:
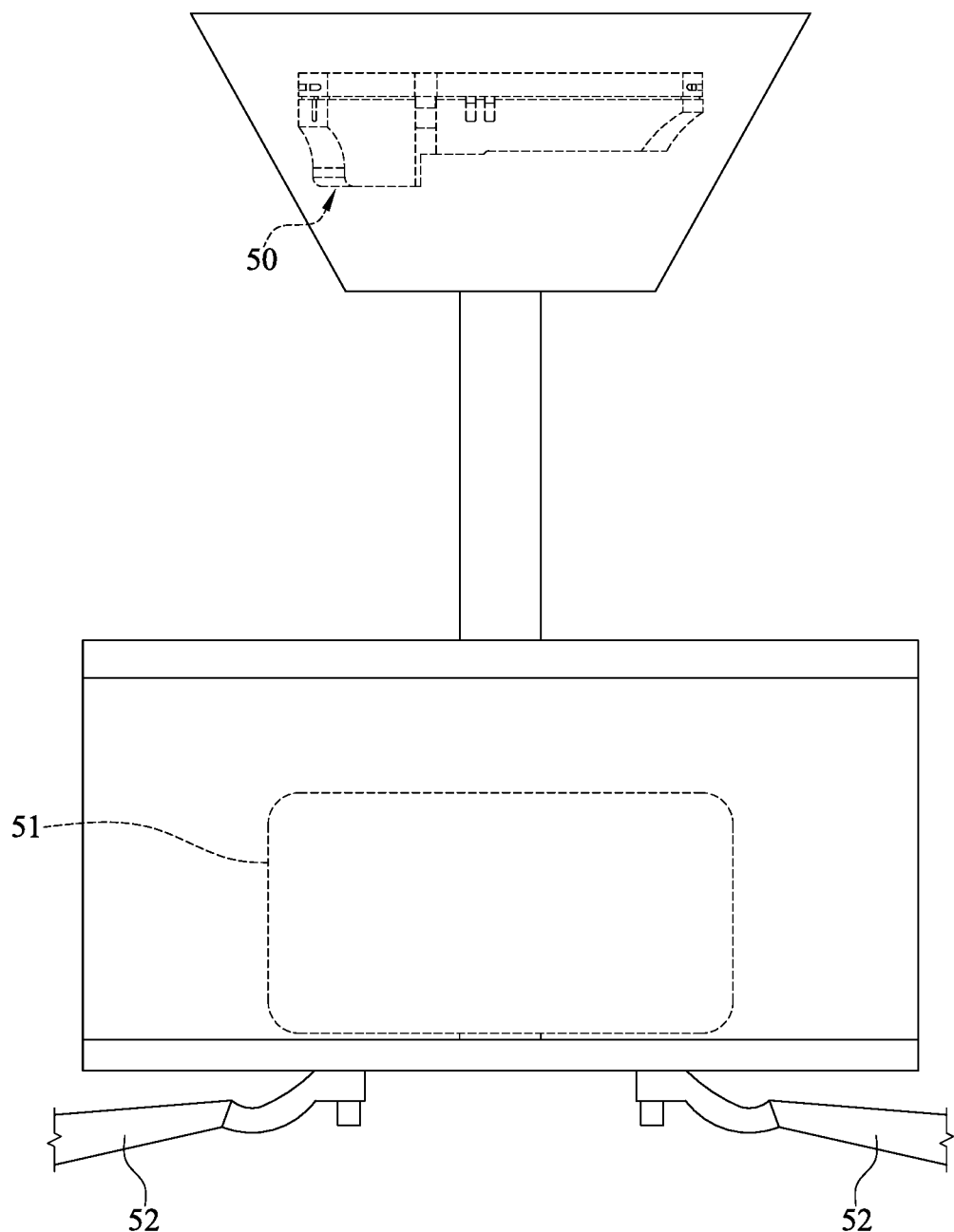
FIG. 6 is a diagram of a structure of a ceiling fan according to one embodiment of the present disclosure.
Figure 7:
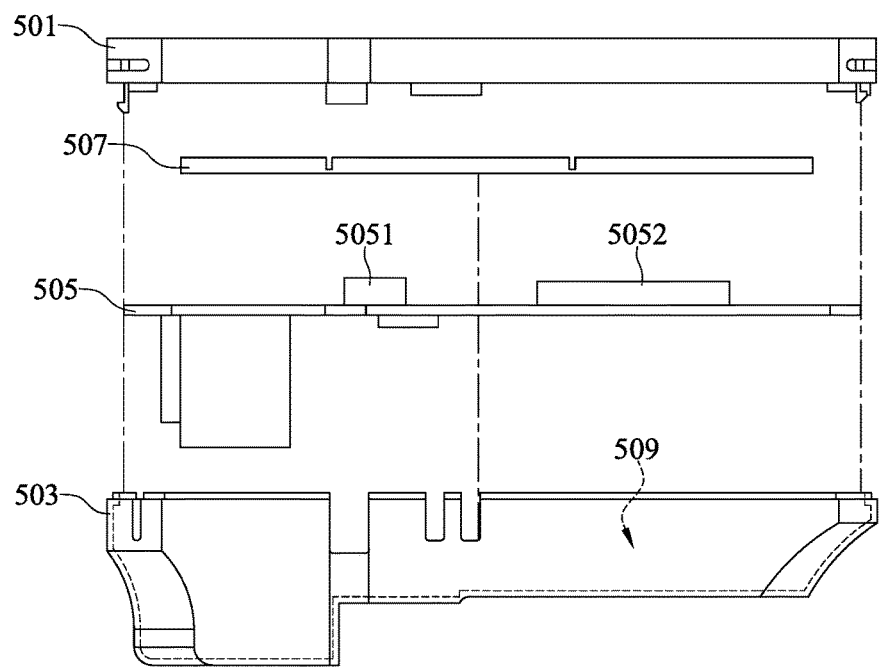
FIG. 7 is a diagram of a structure of a driver according to one embodiment of the present disclosure.

Please refer to FIG. 6 and FIG. 7. FIG. 6 is a diagram of a structure of a ceiling fan according to one embodiment of the present disclosure. FIG. 7 is a diagram of a structure of a driver according to one embodiment of the present disclosure. As shown in FIG. 6 and FIG. 7, a ceiling fan 5 includes a driver 50, a ceiling fan motor 51 and a set of fan blades 52. The driver 50 includes a first cover 501, a second cover 503, a circuit board 505 and a cooling board 507. The first cover 501 and the second cover 503 are combined to form an accommodating space 509. The circuit board 505 is disposed in the accommodating space 509 and the circuit board 505 includes a control system which is identical to the control system 1 as shown in FIG. 1. The circuit board 505 is further equipped with a light-control switch 5051 and a power module 5052. The cooling board 507 is disposed in the accommodating space 509 and combined with the circuit board 505. The ceiling fan motor 51 is electrically connected to the circuit board 505 and controlled by a control command to operate. The control command is sent from the motor driving circuit within the control device of the driver 50. It means that the control device included in the circuit board 505 is electrically connected to the ceiling fan motor 51 and controls the ceiling fan motor 51 to operate based on the control command. The set of fan blades 52 is detachably combined with the ceiling fan motor 51, and the set of fan blades 52 is driven by the ceiling fan motor 51 to rotate.

Please refer to FIG. 8 and FIG. 9, which are respectively a top view and a side view of the cooling board according to one embodiment of the present disclosure. As shown in FIG. 8 and FIG. 9, the cooling board 507 has a plurality of fins such as the fin 5071. Each of the plurality of fins has a width W1 and a depth D2. The plurality of fins are spaced in a distance W2 from one another. In a practical example, the width W1, the depth D2 and the distance W2 are respectively 1 mm, 2 mm and 2 mm. The length L1, the width L2 and the thickness D1 of the cooling board 507 are respectively 105 mm, 47.5 mm, 2.6 mm. Those values of the width, the depth, the length, the thickness, etc mentioned in the above embodiment are for illustration only and the present disclosure is not limited to the embodiment.

Figure 10:
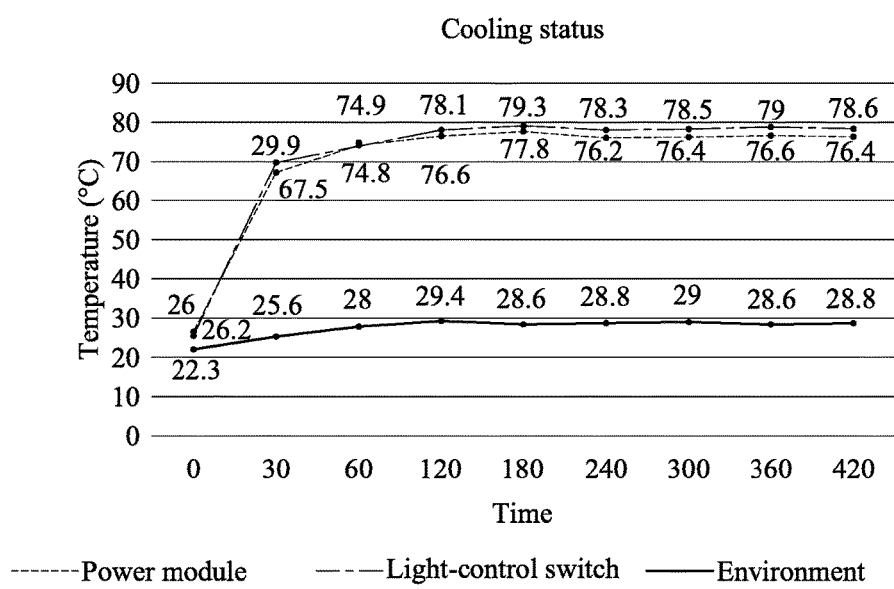
FIG. 10 is a diagram of cooling status with the cooling board installed according to one embodiment of the present disclosure.

In practice, due to the position where the driver 50 is disposed as shown in FIG. 6, the ceiling fan 5 has the advantages of easy maintenance/installation but has the disadvantages of poor cooling. By installing the cooling board 507 into the driver 50 through the screw holes H, the effect of cooling is increased significantly. Please further refer to FIG. 10, which is a diagram of cooling status with the cooling board installed according to one embodiment of the present disclosure. As shown in FIG. 10, after the cooling board 507 is installed, the temperature of the light-control switch 5051 and the temperature of the power module 5052 as well as the environmental temperature remain stable without rising up when the operation time of the ceiling fan passes. For example, the temperature of the light-control switch 5051 and the temperature of the power module 5052 approximately remain in a range of 70° C. to 80° C. and the environmental temperature approximately remains in a range of 25° C. to 30° C. Therefore, the internal elements in the driver 50 would not malfunction or be damaged due to overheat.

Based on the above description, in the method for controlling the ceiling fan motor and the control device for the ceiling fan motor, the target value of rotational speed and the limited value of rotational torque are set in advanced and it is determined whether the current rotational torque of the ceiling fan motor reaches the limited value of rotational torque and then it is further selectively determined whether the current rotational speed reaches the target value of rotational speed so as to determine whether to increase the torque current of the ceiling fan motor. Thereby, a variety of fan blades is not limited by the conventional single constant-speed control method, so overloading of the output power is avoided. Therefore, the diversity of combination of a variety of fan blades as well as the convenience of device maintenance would be achieved. Moreover, the ceiling fan having the control device equipped with the cooling board providing an ideal effect of cooling, so the internal elements in the driver would not be malfunctioned or damaged due to overheat.

What is claimed is:

1. A method for controlling a ceiling fan motor, comprising:
    setting a target value of rotational speed and a limited value of rotational torque related to the ceiling fan motor;
    controlling the ceiling fan motor to operate by a processor;
    obtaining operation information of the ceiling fan motor by a motor-current sampling circuit;
    calculating a current rotational speed and a current rotational torque by the processor according to the operation information;
    determining whether the current rotational torque is greater than or equal to the limited value of rotational torque;
    performing a constant rotational torque operation by the processor when the current rotational torque is greater than or equal to the limited value of rotational torque;
    determining whether the current rotational speed reaches the target value of rotational speed by the processor when the current rotational torque is less than the limited value of rotational torque; and
    performing a constant rotational speed operation by the processor when the processor determines that the current rotational speed reaches the target value of rotational speed; and
    increasing torque current of the ceiling fan motor by the processor and returning to step of obtaining the operation information of the ceiling fan motor by the motor-current sampling circuit when the processor determines that the current rotational speed does not reach the target value of rotational speed.

2. The method for controlling the ceiling fan motor according to claim 1, wherein performing the constant rotational torque operation by the processor comprises controlling the ceiling fan to operate based on the limited value of rotational torque by the processor.

3. The method for controlling the ceiling fan motor according to claim 1, wherein calculating the current rotational speed and the current rotational torque by the processor according to the operation information comprises:

calculating the current rotational torque by the processor according to current information related to the ceiling fan; and calculating the current rotational speed according to the current rotational torque by the processor.

4. The method for controlling the ceiling fan motor according to claim 1, wherein setting the target value of rotational speed and the limited value of rotational torque related to the ceiling fan motor comprises:

receiving an operation signal from a signal emitter by the processor; and setting the target value of rotational speed and the limited value of rotational torque related to the ceiling fan motor by the processor according to the operation signal.

5. A control device for a ceiling fan motor, comprising:

a power supplying circuit configured to acquire an external power so as to output a working voltage;

a processor electrically connected to the power supplying circuit, with the processor operating based on the working voltage, the processor configured to obtain a target value of rotational speed and a limited value of rotational torque related to the ceiling fan motor and generate a control command;

a motor driving circuit electrically connected to the power supplying circuit and the processor, with the motor driving circuit operating based on the working voltage, and the motor driving circuit configured to drive the ceiling fan motor according to the control command; and a motor-current sampling circuit electrically connected to the processor and operating based on the working voltage, with the motor-current sampling circuit configured to obtain operation information related to the ceiling fan motor, the operation information adapted for the processor to obtain a current rotational speed and a current rotational torque, the processor determining whether to perform a constant rotational torque operation according to the current rotational torque and the limited value of rotational torque, and the processor selectively determining whether to increase torque current of the ceiling fan motor according to the current rotational speed and the target value of rotational speed.

6. The control device for the ceiling fan motor according to claim 5, wherein the processor is configured to calculate the current rotational torque related to the ceiling fan motor according to current information of the ceiling fan motor included in the operation information, and the processor is further configured to calculate the current rotational speed related to the ceiling fan motor according to the current rotational torque related to the ceiling fan motor.

7. The control device for the ceiling fan motor according to claim 6, wherein the processor is configured to determine whether the current rotational torque is greater than or equal to the limited value of rotational torque; the processor performs a constant rotational torque operation based on the limited value of rotational torque when the current rotational torque is greater than or equal to the limited value of rotational torque; and the processor determines whether to increase torque current of the ceiling fan motor according to the current rotational speed and the target value of rotational speed when the current rotational torque is less than the limited value of rotational torque.

8. The control device for the ceiling fan motor according to claim 7, wherein the processor performs a constant rotational speed operation based on the target value of rotational speed when the current rotational speed reaches the target value of rotational speed; and the processor continuously increases the torque current when the current rotational speed does not reach the target value of rotational speed.

9. The control device for the ceiling fan motor according to claim 5, wherein the processor performs a constant rotational speed operation based on the target value of rotational speed when the current rotational speed reaches the target value of rotational speed; and the processor continuously increases the torque current when the current rotational speed does not reach the target value of rotational speed.

10. The control device for the ceiling fan motor according to claim 5, wherein the power supplying circuit comprises:

a rectifying circuit configured to receive the external power in AC mode and convert the external power in AC mode into a supplying power in DC mode; and a power conversion circuit electrically connected to the rectifying circuit, the motor driving circuit and the processor, with the power conversion circuit configured to regulate a voltage of the supplying power so as to output the working voltage.

11. A ceiling fan, comprising:

a ceiling fan motor;

a driver, comprising:

a first cover;

a second cover combined with the first cover to form an accommodating space;

a circuit board disposed in the accommodating space, with the circuit board comprising a control device identical to the control device as claim 5, the control device controls the ceiling fan motor according to the control command of the motor driving circuit; and a cooling board disposed in the accommodating space and combined with the circuit board, with the cooling board having a plurality of fins spaced in a distance from one another; and a set of fan blades detachably combined with the ceiling fan motor and driven by the ceiling fan motor to rotate.

* * * * *